(12) United States Patent
Leijon et al.

(10) Patent No.: US 8,664,789 B2
(45) Date of Patent: Mar. 4, 2014

(54) WAVE-POWER UNIT

(75) Inventors: Mats Leijon, Uppsala (SE); Magnus Stålberg, Uppsala (SE); Andrej Savin, Uppsala (SE)

(73) Assignee: Seabased AB, Uppsala (SE)

( * ) Notice: Subject to any disclaimer, the term of this patent is extended or adjusted under 35 U.S.C. 154(b) by 419 days.

(21) Appl. No.: 13/060,627

(22) PCT Filed: Aug. 26, 2008

(86) PCT No.: PCT/SE2008/050964
§ 371 (c)(1),
(2), (4) Date: Apr. 28, 2011

(87) PCT Pub. No.: WO2010/024741
PCT Pub. Date: Mar. 4, 2010

(65) Prior Publication Data
US 2011/0175360 A1    Jul. 21, 2011

(51) Int. Cl.
*F03B 13/10* (2006.01)
*F03B 13/12* (2006.01)
*H02P 9/04* (2006.01)
(52) U.S. Cl.
USPC .......................................................... 290/53
(58) Field of Classification Search
USPC .......................................................... 290/53
See application file for complete search history.

(56) References Cited

U.S. PATENT DOCUMENTS

| | | | | |
|---|---|---|---|---|
| 4,226,720 A * | 10/1980 | Brigante | ...................... | 210/222 |
| 4,398,095 A * | 8/1983 | Ono | .............................. | 290/53 |
| 4,577,925 A * | 3/1986 | Winter et al. | ................. | 385/106 |
| 4,754,157 A | 6/1988 | Windle | ............................ | 290/53 |
| 5,042,903 A * | 8/1991 | Jakubowski | .................. | 385/101 |
| 5,435,134 A | 7/1995 | Nielsen | ........................... | 60/398 |
| 5,468,913 A * | 11/1995 | Seaman et al. | ............ | 174/102 R |
| 6,020,653 A | 2/2000 | Woodbridge et al. | ........... | 290/53 |
| 6,072,928 A * | 6/2000 | Ruffa | ............................. | 385/100 |
| 6,392,551 B2 * | 5/2002 | De Angelis | ................... | 340/584 |
| 6,980,722 B1 * | 12/2005 | Ruffa | ............................. | 385/111 |
| 7,045,912 B2 * | 5/2006 | Leijon et al. | .................... | 290/42 |
| 7,085,457 B2 * | 8/2006 | Lancaster et al. | ............ | 385/101 |
| 7,405,489 B2 | 7/2008 | Leijon et al. | .................... | 290/42 |
| 8,105,052 B1 * | 1/2012 | Hill, Jr. | ........................ | 417/331 |

(Continued)

FOREIGN PATENT DOCUMENTS

| | | |
|---|---|---|
| JP | 06229421 | 8/1994 |
| WO | 03058055 | 7/2003 |

OTHER PUBLICATIONS

English Abstract of JP06-229421, Aug. 16, 1994.

*Primary Examiner* — Pedro J Cuevas
(74) *Attorney, Agent, or Firm* — Dykema Gossett PLLC (57) ABSTRACT

The invention relates to a wave-power unit with a floating body (1) connected by flexible connection means (3) to a translator (6) reciprocating in a linear generator (2), The floating body (1) is arranged for floating on the sea and the stator (8) of the generator for anchoring on the sea bed, According to the invention the connection means is guided by a guiding device (9) through lower and upper openings, The part of the connection means (3) that momentary is within the guiding device (9) is thereby guided to be aligned with the translator movements adjacent the lower opening and to be allowed to be inclined adjacent the upper opening. The invention also relates to a use of the invented wave-power plant and to a method for producing electric energy.

21 Claims, 4 Drawing Sheets

(56) References Cited

U.S. PATENT DOCUMENTS

| | | | |
|---|---|---|---|
| 8,242,370 B2* | 8/2012 | Tanba et al. | 174/120 R |
| 8,288,881 B2* | 10/2012 | Leijon et al. | 290/53 |
| 8,471,398 B2* | 6/2013 | Leijon et al. | 290/53 |
| 2005/0121915 A1* | 6/2005 | Leijon et al. | 290/42 |
| 2006/0137587 A1* | 6/2006 | Aisenbrey | 114/65 R |
| 2007/0212248 A1 | 9/2007 | Nii et al. | 419/28 |
| 2010/0084869 A1* | 4/2010 | Leijon et al. | 290/53 |
| 2010/0327595 A1* | 12/2010 | Gottler | 290/53 |
| 2011/0193347 A1* | 8/2011 | Leijon et al. | 290/53 |
| 2011/0198850 A1* | 8/2011 | Stromstedt et al. | 290/53 |
| 2013/0067904 A1* | 3/2013 | Leijon et al. | 60/506 |
| 2013/0127167 A1* | 5/2013 | Dore et al. | 290/53 |
| 2013/0127168 A1* | 5/2013 | Dragic | 290/53 |
| 2013/0140824 A1* | 6/2013 | Leijon et al. | 290/53 |

* cited by examiner

WAVE-POWER UNIT

FIELD OF INVENTION

The present invention in a first aspect relates to a wave-power unit for the production of electric power which includes a floating body arranged for floating on the sea and an electric linear generator having a stator and a translator reciprocating along a center axis, the stator being arranged to be anchored in the bed of a sea and the translator being connected to the floating body by flexible connection means. The connection means is flexible in the sense that it can be bent, it does not necessarily mean that it is elastic in its longitudinal direction.

In a second aspect the invention relates to a use of a such wave-power unit.

In a third aspect the invention relates to a method of producing electric power by providing a floating body to float on the sea, providing an electric linear generator having a stator and a reciprocating translator, anchoring the stator in the bed of the sea and connecting the translator to the floating body by flexible connection means.

In the present application the terms "radial", and "axial" refer to the axis defined by the reciprocating movement of center of the translator. The terms "upper" and "lower" refer to the vertical direction and relates to the locations of the components in question when the wave-power unit is in operation.

BACKGROUND OF THE INVENTION

Wave movements in the sea and in large inland lakes constitutes a potential source of energy that has scarcely been exploited so far. However various suggestions have been made to use the vertical movements of the sea for producing electrical power in a generator. Since a point on the sea surface makes a reciprocating vertical movement it is suitable to use a linear generator to produce the electric power.

WO 03/058055 discloses such a wave-power unit where the moving part of the generator, i.e. the part that corresponds to the rotor in a rotating generator and in the present application called translator, reciprocates in relation to the stator of the generator. In that disclosure the stator is anchored in the sea bed. The translator is by a wire, cable or a chain connected to a body floating on the sea.

Figure 1:
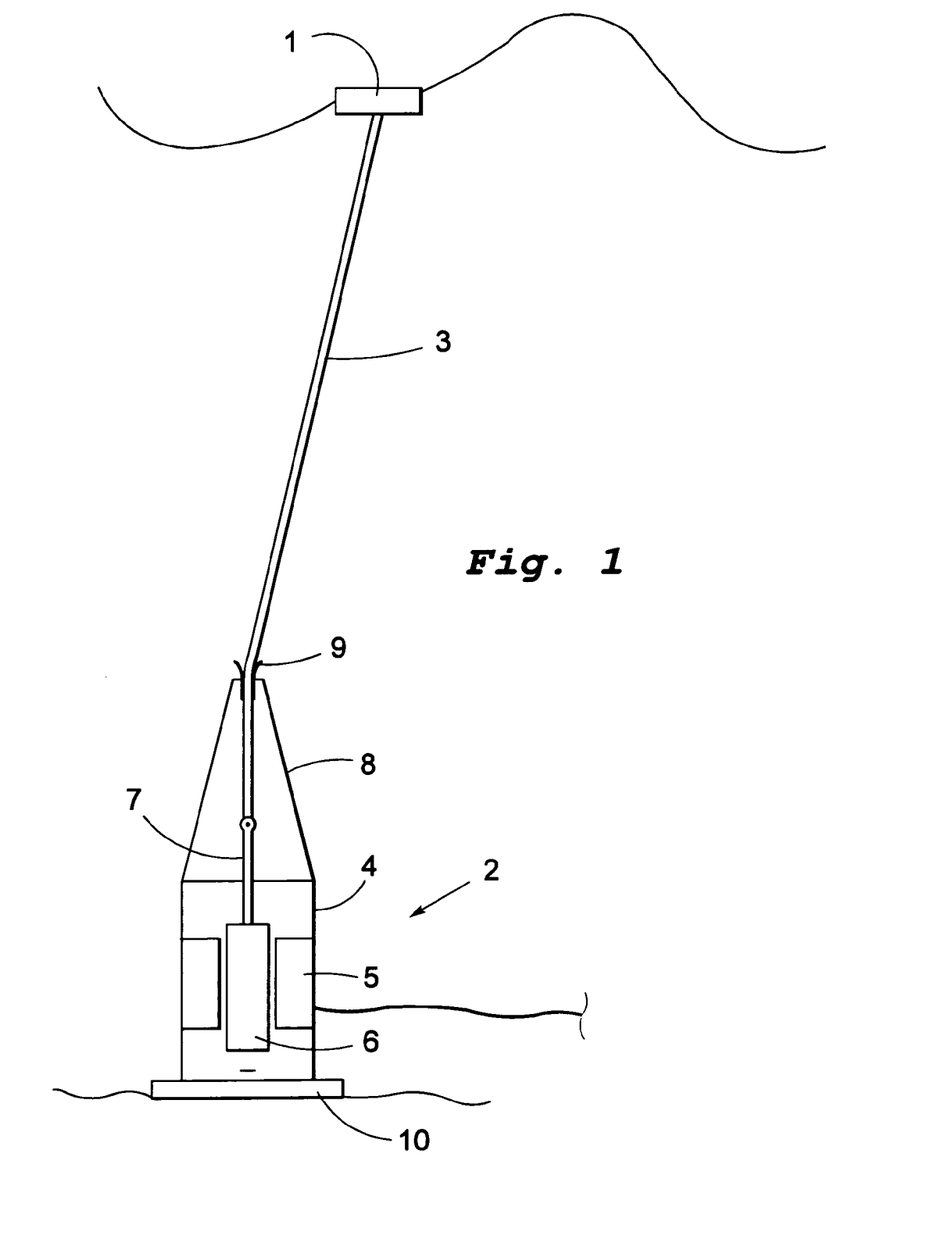
FIG. 1 is a schematic section through a wave-power unit according to the invention.

Ideally the floating body is located vertically above the generator on the axis of the translator as illustrated in FIG. 1 of that disclosure. However, the floating body is exposed also to lateral forces from the waves and from the wind. Therefore the floating body can drift away from that ideal position and will normally be located at a distance therefrom. As a consequence the wire connecting the translator and the floating body will not be aligned with the axis of the translator. This might cause side forces to the translator resulting in that it will not be centred or/and it becomes inclined, which will disturb the operation of the generator.

This can to a large extent be avoided by journaling the translator in the stator. However, when the wire is inclined, the side forces in that case will result in a high load on the journals and disturb the operation.

The object of the present invention is to solve the above mentioned problem and thus provide a wave-power unit where the generator will operate properly irrespective of the relative lateral position of the floating body.

SUMMARY OF INVENTION

The above mentioned object is achieved through the invention in that a wave-power unit of the kind introductionally specified includes the specific features that the wave-power unit includes a guiding device, the connection means being arranged to pass through a lower opening and an upper opening of the guiding device, the portion of the connection means momentarily being located between the openings being defined as the guided portion, the lower opening being arranged such that the guided portion adjacent the lower opening is aligned with a center axis and the upper opening being arranged such that the guided portion adjacent the upper opening is allowed to form an angle with the center axis.

By this guiding device a proper position of the translator within the generator will be secured irrespective of the relative lateral position of the floating body. If the translator movement is guided in the stator by journaling the same, there will be no side forces affecting the journaling. The dimensioning of the journaling thereby can be made much smaller than otherwise and be adapted to what is required solely to guide the reciprocating movement of the translator.

According to a preferred embodiment the guiding device is rigidly connected to a housing of the generator.

Thereby the guiding device in an easy way will be distinctly located in relation to the stator and thus secure a proper alignment with the translator movements.

According to a further preferred embodiment the guiding device is arranged to allow said angle to be formed in an arbitrary radial plane through said center axis.

Although in certain situations and in certain locations the lateral displacement of the floating body in relation to the generator can be foreseen to be in a certain direction, it is often the case that the displacement might occur in any direction. By this embodiment the guiding means will be flexible in this respect and well adapted to take care of displacements in all directions.

According to a further preferred embodiment the guiding means comprises a hollow body, having said lower and upper openings, the upper opening being larger than the lower opening.

This is a simple and reliable way of realizing the guiding device, whereby the larger opening makes it easy to receive an inclined connection means and direct it in an aligned direction when going out from the lower opening towards the translator.

According to a further preferred embodiment, the inner surface of the hollow body is rotational symmetric around the central axis.

The rotational symmetric surface provides a suitable way of obtaining that the guiding device will be adapted for inclination in any direction.

According to a further preferred embodiment in an axial section through the axis of the hollow body, at least an upper part of the profile of the inner surface has a distance to the axis that increases continuously with increasing distance from the lower opening.

Since the connecting means repeatingly reciprocates through the guiding device there will occur wear between the connecting means and the guiding device. In order to obtain a lifetime of the connecting means as long as possible, preferably for many years, it is very important to minimize this wear. The continuously diverging inner surface of the hollow body will keep the wear at a low level.

According to a further preferred embodiment, the upper part of the profile forms an acute angle with the axis, which angle continuously increases with increasing distance from the lower opening and is zero at the lower end of the upper part.

By this geometry of the inner surface, the guiding of the connection means to a direction aligned with that of the translator from a direction that is inclined thereto will be made by a surface that is in contact with the guiding device on a considerable part thereof and there will be no sharp edges or sharp changes in the direction of the connection means. All this contribute to further decrease the wear on the connection means.

According to a further preferred embodiment at least a portion of the upper part of the profile is a parabolic or circular function.

Thereby the contact force between the connection means and the inner surface will be comparatively even along a large part of the contact area. This contributes further to a low wear.

According to a further preferred embodiment the acute angle is in the range of 10-30° at a distance from the lower end of the upper part which distance is at least four times the diameter of the inner surface at the lower end of the upper part.

Within these dimensions the change of direction of the connection means within the guiding device will be limited and occur during a certain distance such that the bending thereof will be smooth. Thereby the wear will be further limited.

According to a further preferred embodiment the acute angle is within the range of 17°-24° and the distance is in the range of 5-10 times.

These dimensions represent an optimization of the aspect mentioned above while simultaneously limiting the guiding device to a reasonable length.

According to a further preferred embodiment a lower part of the profile is parallel with the center axis, which lower part joins the upper part.

Thereby the connection means will be very distinct directed to the direction of the translator movement since it a certain distance will be forced in that direction within the guiding device.

According to a further preferred embodiment the smallest diameter of the inner surface is in the range of 100 to 120% of the width of the connection means.

The part having the smallest diameter is intended for forcing the connection means to be in alignment with the translator movement. The clearance therefore from a geometrical point of view should be practically zero. However a certain clearance is desirable in order not to squeeze the connection means and increase the friction. This would lead to friction losses as well as to increased wear. Within the specified range an acceptable compromise of these two aspects is obtained. With the range of 101 to 105% this compromise is probably optimized.

According to a further preferred embodiment the guiding means includes a hollow insert concentrically located within the hollow body and being resiliently mounted to the hollow body, such that at least the upper part of the insert is movable perpendicular to the axis.

Thereby the insert will be able to tilt relative the hollow body and adapt its orientation to the inclination of the connection means. This provides a softer bending of the connection means and decreases the friction wear. This is particularly favourable when the inclination of the connection means is varying.

According to a further preferred embodiment the hollow body is made of stainless steel.

Thereby the guiding device will be robust, strong and suitable for the corrosive environment in the sea.

According to a further preferred embodiment the inner surface is polished.

This limits the wear on the connecting means.

According to a further preferred embodiment the inner surface has a coating.

By using a suitable material for the coating this embodiment offers an alternative way of limiting the wear on the connecting means.

According to a further preferred embodiment the hollow body on its external surface is provided with radially extending flanges.

This strengthen the hollow body regarding radial forces from the connection means, and by the flanges the wall thickness than of the hollow body can be thinner than otherwise and thereby save material and weight.

According to a further preferred embodiment the hollow body on its external surface is provided with a radially extending disc-shaped element, which includes attachment means for attaching the guiding device to the housing of the generator.

Thereby the guiding device can be attached to the housing in a simple way.

According to a further preferred embodiment the disc-shaped element is axially located approximately in the middle of the axial extension of the hollow body.

According to a further preferred embodiment the connection means is coated.

Thereby the surface of the connection means can be optimized in respect of low friction and high wear resistance.

According to a further preferred embodiment the connection means is a wire and the coating is a carbon based polymer.

A wire is normally the most useful kind of connection means due to its flexibility in combination with strength properties. The said type coating is well suited to meet the requirements on low friction and high wear resistance. Preferably the coating is extruded on the wire.

The dynamic forces from the connection means on the connection is between the guiding device and the housing thereby will be mainly counterbalanced which results in a secure connection. With approximately is meant within a distance from the middle that is ±15% of the length of the hollow body.

The above described preferred embodiments of the invented wave-power unit are specified in the dependent claims.

The invention also relates to a wave-power plant that comprises a plurality of wave-power units according the present invention.

According to the second aspect of the invention the wave-power unit is used for producing electric energy.

With the invented wave-power plant and the invented use corresponding advantages are gained as those of the invented wave-power unit and the preferred embodiments thereof and which have been described above.

According to the third aspect of the invention the invented method includes the specific measures of guiding the connection means by passing it through a lower and upper opening of a guiding device such that the portion of the connection means momentary being located between said openings being defined as the guided portion, whereby the guided portion adjacent the lower opening is guided to be aligned with the center axis and the guided portion adjacent the upper opening is allowed to form an angle with the center axis.

According to preferred embodiments of the invented method it is earned out with a wave-power unit according to the invention, in particular according to any of the preferred embodiments thereof.

With the invented method and the preferred embodiments thereof corresponding advantages are gained as those of the invented wave-power unit and which have been described above.

The invention will be further explained by the following detailed description of an example thereof and with reference to the accompanying drawings.

With inner surface is ment the inner surface of the hollow body, or in case a hollow insert is provided, the inner surface of the insert.

DESCRIPTION OF AN EXAMPLE

FIG. 1 is a schematic side view of a wave-power unit according to the invention in operation in the sea. A floating body 1 floats on the sea surface and is connected by a connection means 3 such as a cable, wire, rope, chain or the like, to a linear generator 2 anchored in the sea bed. In the figure the generator is attached to the sea bed. It is, however, to be understood that the generator can be located above the sea bed and be anchored in some other way.

The linear generator 2 has a stator 5 with windings and a translator 8 with magnets. The translator 8 is able to reciprocate up and down within the stator 5, thereby generating current in the stator windings, which current is transferred to an electric network by an electric cable 11.

The translator 6 includes a rod 7 to which the wire 3 is attached. When the floating body 1, due to the wave movements of the sea surface, is forced to move up, the floating body will pull the translator 6 upwardly. When the floating body thereafter moves down, the translator 6 will move down by gravity.

Optionally, a spring (not shown) or the like acting on the translator 6 can provide an additional downward force.

Since the generator 2 is anchored in the sea bed and the floating body 1 floats freely on the water surface, the floating body is free to move laterally in relation to the generator 2. Thereby the connection means 3 will become inclined.

At the entrance of the connection means 3 into the housing 4 of the generator 2 there is provided a guiding device 9 that guides the connection means to move vertically below the guiding device 9 while allowing the connection means 3 that is above the guiding device to move in an inclined position. The guiding to device 9 is attached to a conical frame 8 rigidly connected to the housing 4 of the generator.

The guiding device 9 allows the connection means 3 to gradually change its direction when passing through guiding device 9, such that the wear of the connection means becomes limited.

Figure 2:
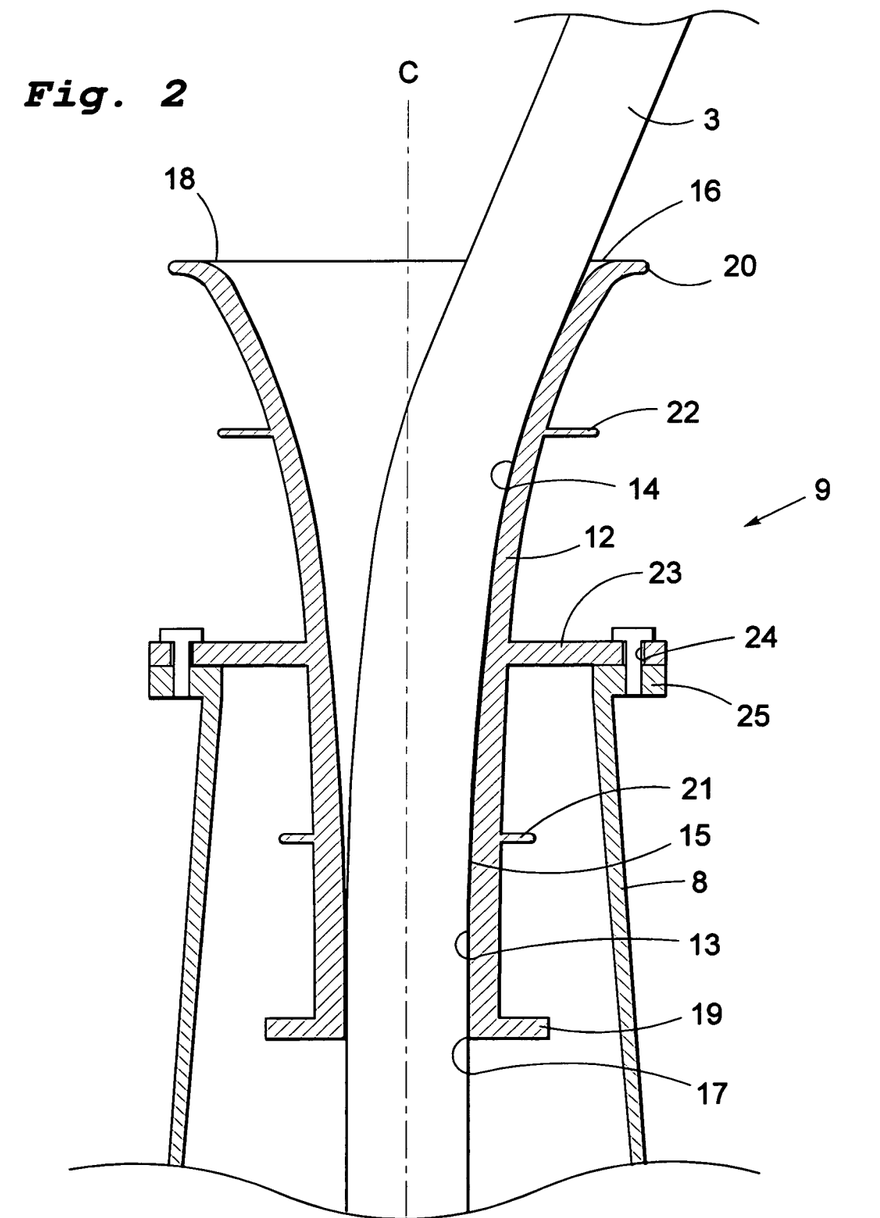
FIG. 2 is an enlargement of a detail of FIG. 1.

The guiding device is illustrated more in detail in FIG. 2, which is an axial section therethrough. The guiding device 9 in this example consists of a hollow body 12 that is moulded in one piece. The inner surface of the hollow body 12 is rotationally symmetric around the axis C, which is the same axis as the axis of the reciprocating movement of the center of the translator 6. The hollow body 12 has a lower opening 17 and an upper opening 18, through which openings the connection means 3 passes.

The profile of the inner surface in an axial section is visible in FIG. 2. A lower part 13 of this surface is cylindrical and thus has its profile in parallel with the center axis C. An upper part 14 of the inner surface has a continuously increasing diameter, such that the profile of this part forms an acute angle with the center axis. The acute angle increases continuously from the lower end 15 of the upper part 14, which means that the profile follows a curve. Preferably, a major portion of this curve is parabolic or circular.

A small portion 16 of the upper part 14 adjacent the upper opening has a profile where the acute angle increase more rapidly than on the rest of the upper part such that the angle reaches 90° at the upper end.

At the lower end 15 of the upper part 14 where this part joins the lower part 13 the angle of the profile is zero.

In the example illustrated in the figure, the connection means 3 is a rope of plastic, thus being substantially circular. The lower part 13 of the inner surface has a diameter that is slightly larger than the diameter of the rope.

In operation the rope moves up and down through the hollow body 12. As mentioned the rope normally is inclined between the guiding means 9 and the floating body as illustrated in the figure. Due to the shape of the inner surface of the hollow body 12, the rope changes its direction when passing therethrough such that it is vertical when passing through the lower opening 17. From above the rope will come into contact tangentially with the inner surface somewhere on its upper part 14. The axial location of this contact point depends on how much the rope is inclined. From the contact point the rope will be in contact with the inner surface along its complete extension and continuously change its angle from the contact point down to the location 15 where the lower part 13 and the upper part 14 join each other, The hollow body 12 is made of stainless steel and its inner surface is polished or coated.

Externally the hollow body 12 has a radial flange 19 at the lower opening 17. A corresponding flange 20 is present at the upper opening 18 which flange is naturally formed due to the profile of the inner surface at this end. Further external radial flanges 21, 22 are located along the hollow body 12. The flanges reinforce the hollow body.

In the axially middle region of the hollow body 12 it is provided with a disc-shaped element 23 having bolt holes 24 for attaching the element 23 to a flange 25 at the upper end of the frame 8.

Figure 3:
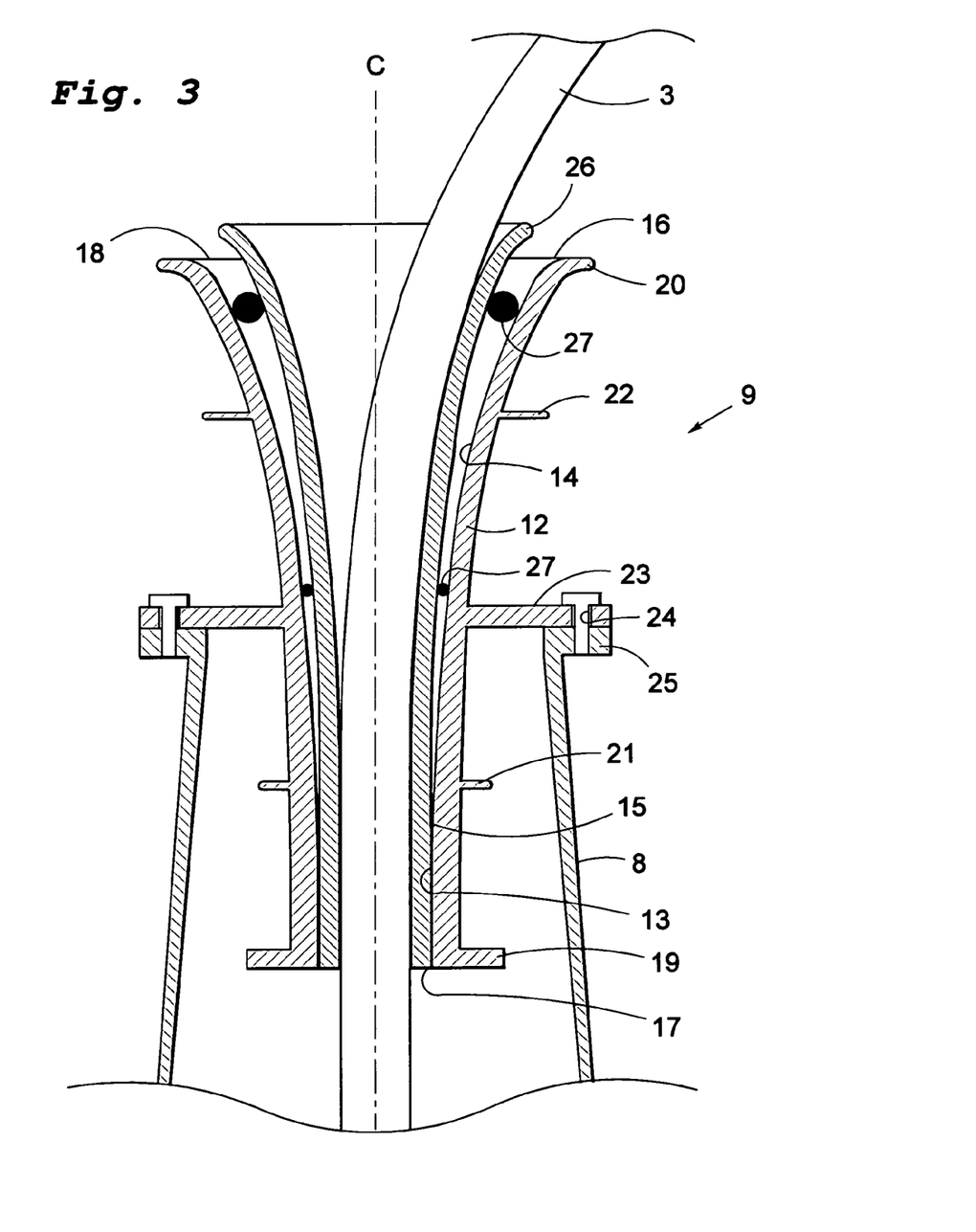
FIG. 3 illustrates an alternative example in a section corresponding to that of FIG. 2.

FIG. 3 illustrates an alternative example where a hollow insert 26 is located within the hollow body 12. The insert 26 has a shape that substantially corresponds to that of the hollow body 12. The insert is resiliently mounted in the hollow body, e.g. by means of two rubber rings 27. Of course other kinds of springs can be used for that purpose. Additionally or alternatively the resiliency can be obtained by making the insert itself resilient, e.g. of resilient material and/or by providing axial slots at the upper and/or lower and of the insert.

Figure 4:
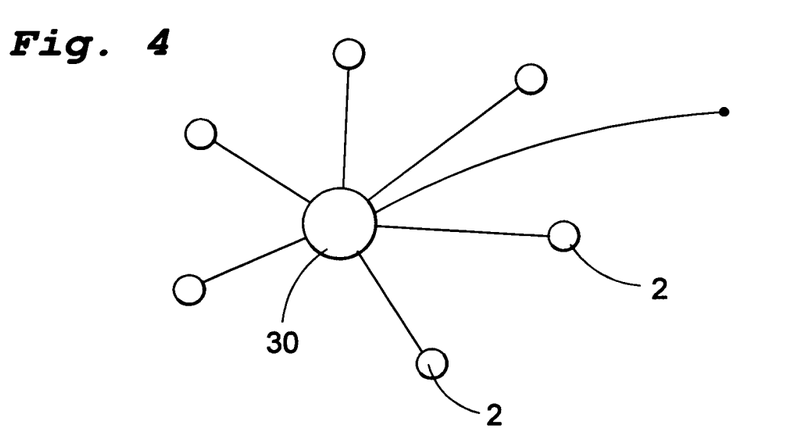
FIG. 4 schematically illustrates a wave-power plant according to the invention.

FIG. 4 in a view from above schematically illustrates a wave-power plant having a plurality of wave-power units of the kind disclosed in FIGS. 1 and 2. The generators 2 of these units are ail connected to a submerged switchgear 30 connected to an electric network.

The invention claimed is:

1. A wave-power unit for the production of electric power and comprising a floating body arranged for floating on the sea and an electric linear generator having a stator and a translator reciprocating along a center axis, the stator being arranged to be anchored in the bed of a sea and the translator being connected to the floating body by flexible connection means, wherein the wave-power unit includes a guiding device comprising a hollow body having an axial extension and lower and upper openings, the upper opening being larger than the lower opening and both openings being smaller than the axial extension of the hollow body, the connection means being arranged to pass through the lower opening and the upper opening of the guiding device, the portion of the connection means
    momentarily being located between said openings being defined as the guided portion, the lower opening being arranged such that the guided portion adjacent the lower opening is aligned with said center axis and the upper opening being arranged such that the guided portion adjacent the upper opening is allowed to form an angle with the center axis.

2. The wave-power unit according to claim 1, wherein the guiding device is rigidly connected to a housing of the generator.

3. The wave-power unit according to claim 1, wherein the guiding device is arranged to allow said angle to be formed in an arbitrary radial plane through said center axis.

4. The wave-power unit according to claim 2, wherein an inner surface of the hollow body is rotationally symmetric to the center axis.

5. The wave-power unit according to claim 4, wherein in an axial section through the axis of the hollow body, at least an upper part of a profile of the inner surface has a distance to the axis that increases continuously with increasing distance from the lower opening.

6. The wave-power unit according to claim 5, wherein said upper part of the profile forms an acute angle with the axis, which angle continuously increases with increasing distance from the lower opening, and is zero at the lower end of the upper part.

7. The wave-power unit according to claim 6, wherein at least a portion of the upper part of the profile follows a parabolic or circular curve.

8. The wave-power unit according to claim 6, wherein said acute angle is in the range of 10-30° at a distance from the lower end of the of the upper part, which distance is at least four times the diameter of the inner surface at the lower end of the upper part.

9. The wave-power unit according to claim 8, wherein said range of the acute angle is 17-24° and said distance is in the range of 5-10 times.

10. The wave-power unit according to claim 6, wherein a lower part of the profile is parallel with the center axis, which lower part joins the upper part.

11. The wave-power unit according to claim 4, wherein the smallest diameter of the inner surface is in the range of 100-120% of the width of the connection means.

12. The wave-power unit according to claim 11, wherein the guiding means includes a hollow insert concentrically located within the hollow body and being resiliently mounted to the hollow body such that at least the upper part of the insert is movable perpendicular to the axis.

13. The wave-power unit according to claim 12, wherein the hollow body is made of stainless steel.

14. The wave-power unit according to claim 13, wherein the inner surface is polished.

15. The wave-power unit according to claim 13, wherein the inner surface has a coating.

16. The wave-power unit according to claim 4, wherein the hollow body on its external surface is produced with radially extending flanges.

17. The wave-power unit according to claim 4, wherein the hollow body on an external surface is provided with a radially extending disc-shaped element, which includes attachment means for attaching the guiding device to the housing of the generator.

18. The wave-power unit according to claim 17, wherein the disc-shaped element is located approximately in the middle of the axial extension of the hollow body.

19. The wave-power unit according to claim 1, wherein the connection means is coated.

20. The wave-power unit according to claim 19, wherein the connection means is a wire and the coating is carbon based polymer.

21. A method of producing electric power by providing a floating body to float on the sea, providing an electric linear generator having a stator and a translator reciprocating along a center axis, anchoring the stator in the bed of the sea and connecting the translator to the floating body by flexible connection means, and guiding the connection means by passing it through a lower and upper opening of a guiding device, wherein the guiding device comprises a hollow body having an axial extension, the upper opening being larger than the lower opening, and both openings being smaller than the axial extension of the hollow body, such that the portion of the connection means momentarily being located between said openings being defined as the guided portion, whereby the guided portion adjacent the lower opening is guided to be aligned with the center axis and the guided portion adjacent the upper opening is allowed to form an angle with the center axis.

* * * * *

UNITED STATES PATENT AND TRADEMARK OFFICE
CERTIFICATE OF CORRECTION

PATENT NO. : 8,664,789 B2
APPLICATION NO. : 13/060627
DATED : March 4, 2014
INVENTOR(S) : Leijon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 449 days.

Signed and Sealed this
Twenty-ninth Day of September, 2015

Michelle K. Lee
*Director of the United States Patent and Trademark Office*